(12) United States Patent
Tu et al.

(10) Patent No.: US 10,746,403 B2
(45) Date of Patent: Aug. 18, 2020

(54) COOLED WALL ASSEMBLY FOR A COMBUSTOR AND METHOD OF DESIGN

(71) Applicant: United Technologies Corporation, Hartford, CT (US)

(72) Inventors: John S. Tu, West Hartford, CT (US); Steven W. Burd, Cheshire, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 673 days.

(21) Appl. No.: 14/939,619

(22) Filed: Nov. 12, 2015

(65) Prior Publication Data
US 2016/0169512 A1    Jun. 16, 2016

Related U.S. Application Data

(60) Provisional application No. 62/091,189, filed on Dec. 12, 2014.

(51) Int. Cl.
F23M 5/00       (2006.01)
F23R 3/00       (2006.01)
(Continued)

(52) U.S. Cl.
CPC ............. F23M 5/085 (2013.01); F23R 3/002 (2013.01); F23R 3/06 (2013.01);
(Continued)

(58) Field of Classification Search
CPC .. F23R 3/06; F23R 3/002; F23R 2900/03041; F23R 2900/03042; F23R 2900/03044; F23R 2900/03045; F23M 5/085; F05D 2260/201; F05D 2260/202; F05D 2260/203; F05D 2260/22141
See application file for complete search history.

(56) References Cited

U.S. PATENT DOCUMENTS 4,695,247 A      9/1987  Enzaki et al.
5,586,866 A  *  12/1996  Wettstein ................ F01D 5/189
                                                       416/96 A
(Continued)

FOREIGN PATENT DOCUMENTS

EP            3018416         5/2016
WO    WO 2014113007 A1  *  7/2014  .............. F23R 3/002

OTHER PUBLICATIONS

Extended EP Search Report dated Apr. 14, 2016.
EP Office Action dated Aug. 1, 2018.

*Primary Examiner* — Todd E Manahan
*Assistant Examiner* — Edwin Kang
(74) *Attorney, Agent, or Firm* — Getz Balich LLC

(57) ABSTRACT

A wall assembly that may be for a combustor of a gas turbine engine includes a liner having a hot face that defines a combustion chamber, an opposite cold face, and a plurality of effusion holes. A shell of the assembly is spaced outward from the cold face and includes a plurality of impingement holes each having a centerline orientated substantially normal to the cold face. A plurality of cooling member arrays of the liner each include a first plurality of members that may be pins projecting outward from the cold face to conduct heat out of the liner. Each array is spaced between adjacent effusion holes and is symmetrically orientated about the respective centerline.

16 Claims, 4 Drawing Sheets

(51) Int. Cl.
*F23M 5/08* (2006.01)
*F23R 3/06* (2006.01)

(52) U.S. Cl.
CPC .............. *F23M 2900/05003* (2013.01); *F23R 2900/03041* (2013.01); *F23R 2900/03042* (2013.01); *F23R 2900/03044* (2013.01); *F23R 2900/03045* (2013.01); *Y02T 50/675* (2013.01)

(56) References Cited

U.S. PATENT DOCUMENTS

| | | | |
|---|---|---|---|
| 8,444,376 B2 * | 5/2013 | Krueckels | F01D 5/187 415/116 |
| 8,978,385 B2 | 3/2015 | Cunha | |
| 9,057,523 B2 | 6/2015 | Cunha et al. | |
| 9,194,585 B2 | 11/2015 | Cunha et al. | |
| 9,217,568 B2 | 12/2015 | Cunha et al. | |
| 9,239,165 B2 | 1/2016 | Cunha et al. | |
| 9,243,801 B2 | 1/2016 | Cunha et al. | |
| 2004/0211188 A1 * | 10/2004 | Alkabie | F23R 3/002 60/772 |
| 2008/0264065 A1 | 10/2008 | Gerendas | |
| 2010/0126960 A1 | 5/2010 | Cunha | |
| 2011/0027102 A1 | 2/2011 | Nakamata et al. | |
| 2011/0262695 A1 * | 10/2011 | Lee | F01D 5/182 428/131 |
| 2012/0060504 A1 * | 3/2012 | Dugar | F23R 3/002 60/772 |
| 2013/0055722 A1 * | 3/2013 | Verhiel | F23R 3/007 60/772 |
| 2013/0180252 A1 * | 7/2013 | Chen | F23R 3/002 60/754 |
| 2014/0020393 A1 | 1/2014 | Nakamata et al. | |
| 2014/0238031 A1 * | 8/2014 | Okita | F23R 3/06 60/754 |
| 2014/0290256 A1 * | 10/2014 | Fujimoto | F01D 5/189 60/752 |
| 2015/0013340 A1 * | 1/2015 | Pinnick | F23R 3/002 60/754 |
| 2015/0184857 A1 | 7/2015 | Cunha et al. | |
| 2015/0285498 A1 | 10/2015 | Cunha et al. | |
| 2015/0292741 A1 | 10/2015 | Cunha et al. | |
| 2015/0362192 A1 | 12/2015 | Cunha et al. | |

* cited by examiner

COOLED WALL ASSEMBLY FOR A COMBUSTOR AND METHOD OF DESIGN

BACKGROUND

The present disclosure relates to a gas turbine engine and, more particularly, to cooling of a combustor wall assembly and method of design.

Gas turbine engines, such as those that power modem commercial and military aircraft, include a fan section to propel the aircraft, compressor section to pressurize a supply of air from the fan section, a combustor section to burn a hydrocarbon fuel in the presence of the pressurized air, and a turbine section to extract energy from the resultant combustion gases and generate thrust.

The combustor section may have an annular wall assembly having inner and outer shells that support respective inner and outer heat shielding liners. The liners may be comprised of a plurality of floating heat shields or panels that together define an annular combustion chamber. An annular cooling cavity is defined between the respective shells and liners for supplying cooling air to an opposite hot side of the panels through a plurality of strategically placed effusion holes. Impingement holes are located in the shell for supply cooling air from an outer air plenum and into the cavity. The effusion holes are generally orientated to create a protective blanket, or, air film over the hot side of the panels, thereby protecting the panels from the hot combustion gases in the chamber. Cooling pins may be located in the cavity and project outward from the cold side of the liner to further conduct heat out of the liner.

Unfortunately, the placement of impingement holes, effusion holes and cooling pins relative to one another is somewhat random complicating wall assembly design with respect to cooling and leading to less than optimal use of cooling air that may reduce engine efficiency.

SUMMARY

A combustor wall assembly according to one, non-limiting, embodiment of the present disclosure includes a liner including a hot face defining a combustion chamber, an opposite cold face, a plurality of effusion holes; a shell spaced outward from the cold face, the shell including a plurality of impingement holes each having a centerline orientated substantially normal to the cold face; and a plurality of cooling pin arrays each including a first plurality of pins projecting outward from the cold face, wherein each pin array is spaced between adjacent effusion holes of the plurality of effusion holes and orientated about the respective centerline.

Additionally to the foregoing embodiment, the plurality of effusion holes and the plurality of impingement holes do not overlap.

In the alternative or additionally thereto, in the foregoing embodiment, each one of the plurality of impingement holes includes a footprint cast upon the cold surface about the respective centerline and spaced from adjacent effusion holes of the plurality of effusion holes.

In the alternative or additionally thereto, in the foregoing embodiment, each pin of the first plurality of pins are located at least in-part within the footprint.

In the alternative or additionally thereto, in the foregoing embodiment, each one of the plurality of cooling pin arrays include a second plurality of pins disposed outside of the footprint.

In the alternative or additionally thereto, in the foregoing embodiment, the first plurality of pins are shorter than the second plurality of pins.

In the alternative or additionally thereto, in the foregoing embodiment, the shell is spaced from the cold face by a distance, each one of the first plurality of pins have a height within a range of thirty to seventy percent of the distance, and each one of the second plurality of pins have a height within a range of seventy-five to one-hundred percent of the distance.

In the alternative or additionally thereto, in the foregoing embodiment, the plurality of effusion holes and the plurality of impingement holes are each arranged in an orthogonal pattern.

In the alternative or additionally thereto, in the foregoing embodiment, the plurality of effusion holes are arranged in a plurality of effusion rows and a plurality of effusion columns, and the plurality of impingement holes are arranged in a plurality of impingement rows and a plurality of impingement columns.

In the alternative or additionally thereto, in the foregoing embodiment, each one of the plurality of impingement rows co-extend with every other one of the plurality of effusion rows.

In the alternative or additionally thereto, in the foregoing embodiment, each one of the plurality of impingement columns co-extend with every other one of the plurality of effusion columns.

In the alternative or additionally thereto, in the foregoing embodiment, each one of the plurality of cooling pin arrays are arranged in an orthogonal pattern.

In the alternative or additionally thereto, in the foregoing embodiment, each one of the plurality of cooling pin arrays are arranged in a plurality of pin rows and a plurality of pin columns.

In the alternative or additionally thereto, in the foregoing embodiment, the plurality of pin columns is three columns and the plurality pin rows is three rows.

In the alternative or additionally thereto, in the foregoing embodiment, the plurality of pin columns is four columns and the plurality of pin rows is four rows.

A combustor wall assembly of a gas turbine engine according to another, non-limiting, embodiment includes a liner including a face and a plurality of effusion holes communicating through the liner; and a plurality of cooling member arrays spaced between the plurality of effusion holes and projecting outward from the face, each one of the plurality of cooling member arrays having a first plurality of cooling members substantially located within an impingement footprint located on the face and a second plurality of cooling members located outside of and distributed about the impingement footprint.

Additionally to the foregoing embodiment, the first plurality of cooling members project outward from the face by a distance less than a projecting distance of the second plurality of cooling members.

In the alternative or additionally thereto, in the foregoing embodiment, at least one of the first and second plurality of cooling members are pins.

In the alternative or additionally thereto, in the foregoing embodiment, the wall assembly includes a shell having a plurality of impingement holes offset from the plurality of effusion holes, and wherein a cooling cavity is defined between the shell and the face with the plurality of cooling member arrays located in the cooling cavity.

A method of designing a cooled combustor wall assembly according to another, non-limiting, embodiment includes the steps of dividing a region of a cold side of a liner to be cooled into a repeating pattern of impingement footprints; dividing the region into a repeating pattern of effusion holes orientated such that the effusion holes do not overlap the impingement footprints; and orientating at least one cooling member array having a known cooling capacity to each respective footprint.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
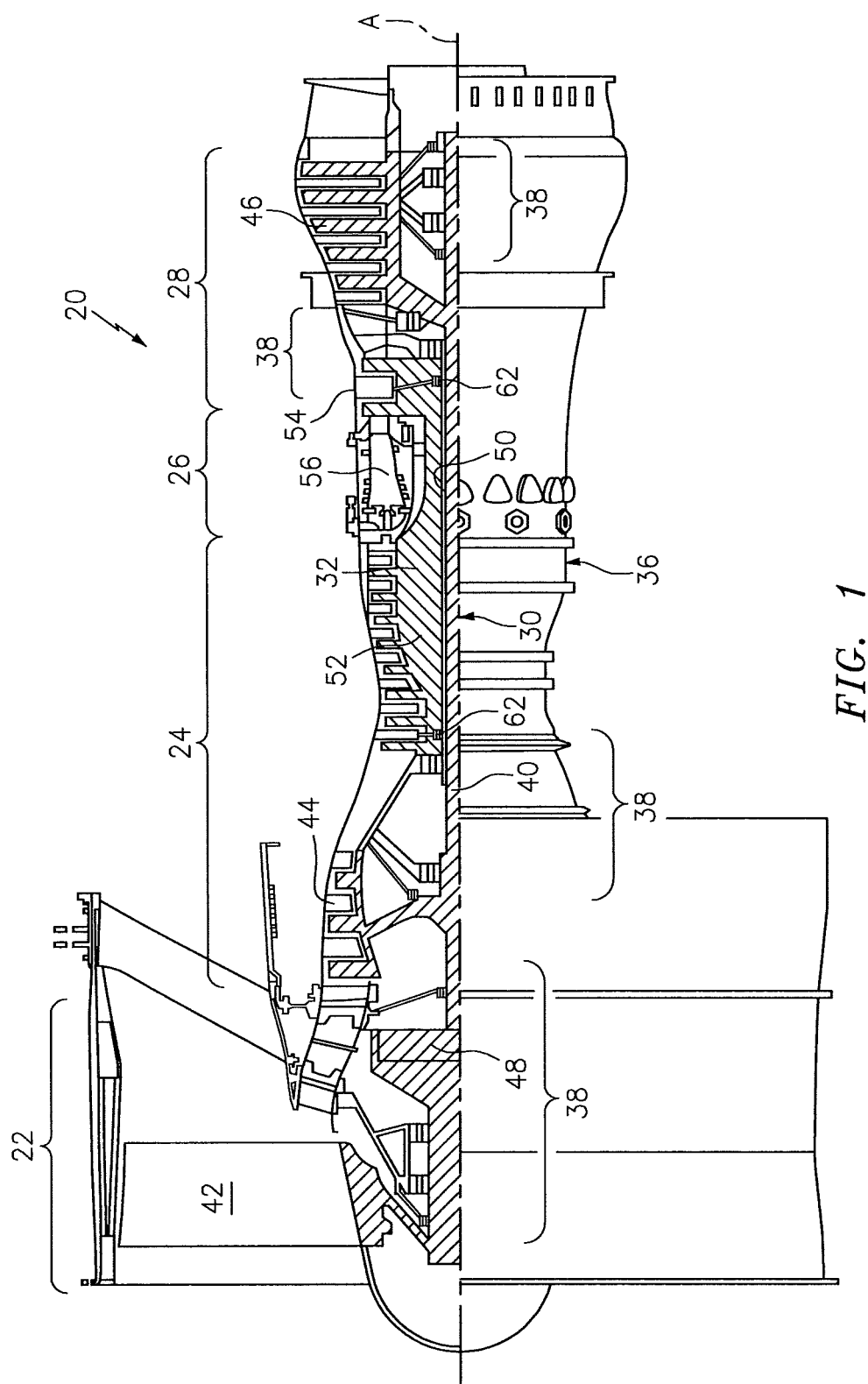
FIG. 1 is a schematic cross-section of a gas turbine engine.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engines such as a turbojets, turboshafts, and three-spool (plus fan) turbofans wherein an intermediate spool includes an intermediate pressure compressor ("IPC") between a Low Pressure Compressor ("LPC") and a High Pressure Compressor ("HPC"), and an Intermediate Pressure Turbine ("IPT") between the High Pressure Turbine ("HPT") and the Low Pressure Turbine ("LPT").

The engine 20 generally includes a low spool 30 and a high spool 32 mounted for rotation about a central, longitudinal, engine axis A relative to an engine static structure 36 or engine case via several bearing structures 38. The low spool 30 generally includes an inner shaft 40 that interconnects a fan 42 of the fan section 22, a LPC 44 of the compressor section 24 and a LPT 46 of the turbine section 28. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a HPC 52 of the compressor section 24 and HPT 54 of the turbine section 28. A combustor 56 of the combustor section 26 is arranged between the HPC 52 and the HPT 54. The inner shaft 40 and the outer shaft 50 are concentric and rotate about the engine central longitudinal axis A that is collinear with their longitudinal axes. Core airflow is compressed by the LPC 44 then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3:1, and in another example is greater than about 2.5:1. The geared turbofan enables operation of the low spool 30 at higher speeds that can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be understood; however, that the above parameters are only exemplary of one embodiment of a geared architecture engine and that the present disclosure is applicable to other gas turbine engines including direct drive turbofans.

In one embodiment, a significant amount of thrust is provided by the bypass flow path B due to the high bypass ratio. The fan section 22 of the gas turbine engine 20 is designed for a particular flight condition—typically cruise at about 0.8 Mach and about 35,000 feet (10,668 meters). This flight condition, with the gas turbine engine 20 at its best fuel consumption, is also known as Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane System. The low Fan Pressure Ratio according to one, non-limiting, embodiment of the example gas turbine engine 20 is less than 1.45. Low Corrected Fan Tip Speed is the actual fan tip speed divided by an industry standard temperature correction of $(T/518.7)^{0.5}$ in which "T" represents the ambient temperature in degrees Rankine. The Low Corrected Fan Tip Speed according to one non-limiting embodiment of the example gas turbine engine 20 is less than about 1,150 feet per second (351 meters per second).

Figure 2:
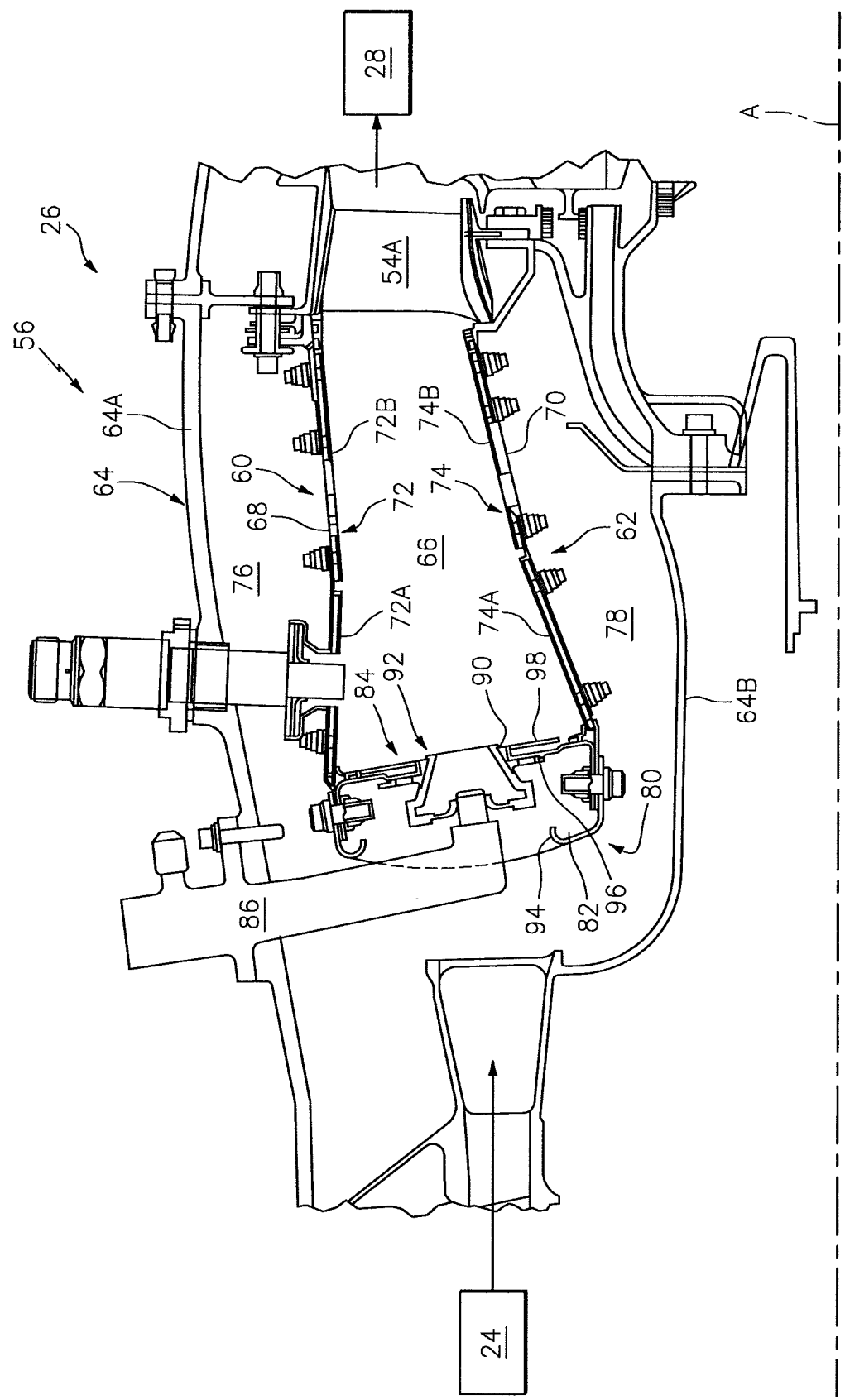
FIG. 2 is a cross-section of a combustor section.

With reference to FIG. 2, the combustor section 26 generally includes a combustor 56 with an outer combustor wall assembly 60, an inner combustor wall assembly 62 and a diffuser case module 64 that encases assemblies 60, 62. The outer combustor wall assembly 60 and the inner combustor wall assembly 62 are radially spaced apart such that an annular combustion chamber 66 is defined therebetween.

The outer combustor wall assembly 60 is spaced radially inward from an outer diffuser case 64A of the diffuser case module 64 to define an outer annular plenum 76. The inner combustor wall assembly 62 is spaced radially outward from an inner diffuser case 64B of the diffuser case module 64 to define an inner annular plenum 78. It should be understood that although a particular combustor is illustrated, other combustor types with various combustor liner arrangements will also benefit. It should be further understood that the disclosed cooling flow paths are but an illustrated embodiment and should not be limited.

The combustion chamber 66 contains the combustion products that flow axially toward the turbine section 28. Each combustor wall assembly 60, 62 generally includes a respective support shell 68, 70 that supports one or more liners 72, 74 mounted thereto. Each of the liners 72, 74 may be formed of a plurality of floating heat shields or panels that are generally rectilinear and manufactured of, for example, a nickel based super alloy that may be coated with a ceramic, or other temperature resistant material, and are arranged to form a liner array. Each liner may have a plurality of forward panels 72A and a plurality of aft panels 72B that line the outer shell 68. A plurality of forward panels 74A and a plurality of aft panels 74B also line the inner shell 70. It should be appreciated that the liner array may alternatively include but a single panel rather than the illustrated axial forward and axial aft panels.

The combustor 56 further includes a forward assembly 80 immediately downstream of the compressor section 24 to receive compressed airflow therefrom. The forward assembly 80 generally includes an annular hood 82, a bulkhead assembly 84, and a plurality of swirlers 90 (one shown). Each of the swirlers 90 is circumferentially aligned with one of a plurality of fuel nozzles 86 (one shown) and a respective one of a plurality of hood ports 94. The bulkhead assembly 84 includes a bulkhead support shell 96 secured to the combustor walls 60, 62, and a liner that may have a plurality of circumferentially distributed bulkhead heat shields or panels 98 secured to the bulkhead support shell 96 around each of a respective swirler opening 92. The bulkhead support shell 96 is generally annular and the plurality of circumferentially distributed bulkhead panels 98 are segmented, typically one to each fuel nozzle 86 and swirler 90.

The annular hood 82 extends radially between, and is secured to, the forwardmost ends of the combustor wall assemblies 60, 62. Each one of the plurality of circumferentially distributed hood ports 94 receives a respective one of the plurality of fuel nozzles 86 and facilitates the direction of compressed air into the forward end of the combustion chamber 66 through the swirler opening 92. Each fuel nozzle 86 may be secured to the diffuser case module 64 and projects through one of the hood ports 94 into the respective swirler opening 92.

The forward assembly 80 introduces core combustion air into the forward section of the combustion chamber 66 while the remainder enters the outer annular plenum 76 and the inner annular plenum 78. The plurality of fuel nozzles 86 and adjacent structure generate a blended fuel-air mixture that supports stable combustion in the combustion chamber 66.

Opposite the forward assembly 80, the outer and inner support shells 68, 70 may be mounted adjacent to a first row of Nozzle Guide Vanes (NGVs) 54A in the HPT 54. The NGVs 54A are static engine components which direct core airflow combustion gases onto the turbine blades of the first turbine rotor in the turbine section 28 to facilitate the conversion of pressure energy into kinetic energy. The core airflow combustion gases are also accelerated by the NGVs 54A because of their convergent shape and are typically given a "spin" or a "swirl" in the direction of turbine rotor rotation. The turbine rotor blades absorb this energy to drive the turbine rotor at high speed.

Figure 3:
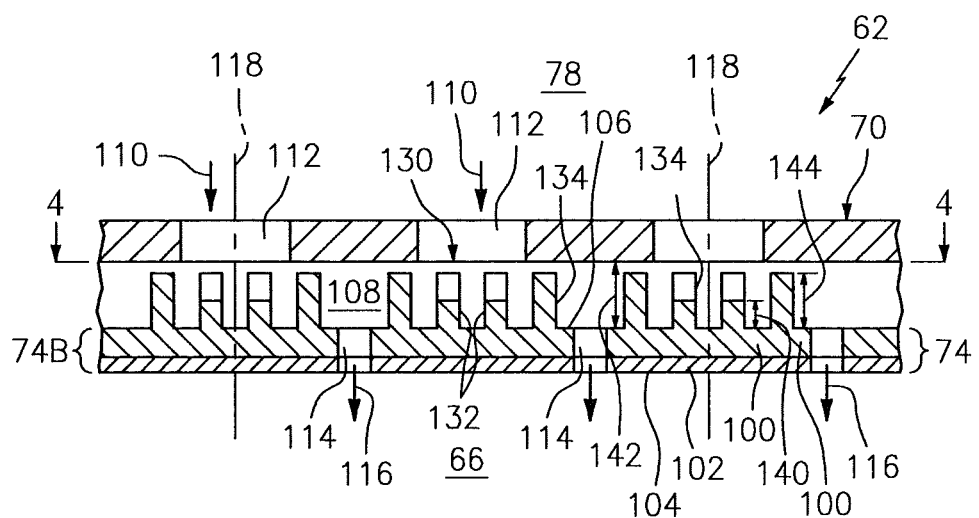
FIG. 3 is a partial cross section of a wall assembly of the combustor section.
Figure 4:
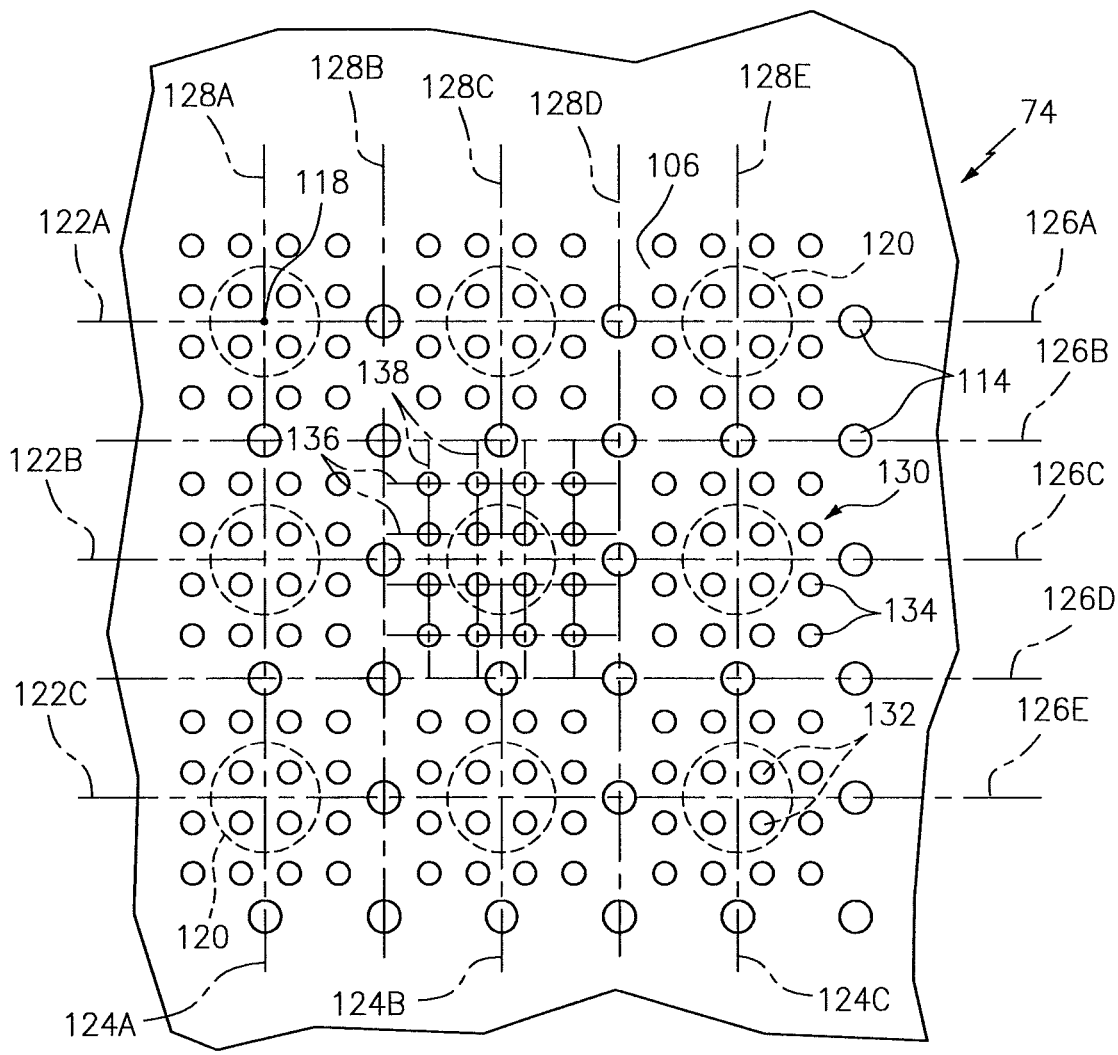
FIG. 4 is a plan view of a liner of the wall assembly viewing in the direction of line 4-4 in FIG. 3.

Referring to FIGS. 3 and 4, the inner liner 74 and inner shell 70 of the inner wall assembly 62 is illustrated to show one, non-limiting, embodiment of the disclosure; however, it is understood that the same teachings may apply to the outer wall assembly 60. The heat shield or panel 74B of liner 74 has a generally planar panel substrate 100 that may be covered by a thermal barrier coating 102 that defines a boundary of the annular combustion chamber 66. The liner 74 has a hot or first face 104 that may be carried by the coating 102, and an opposite cold or second face 106 carried by the substrate 100.

An annular cooling cavity 108 of wall assembly 62 is radially defined between the cold face 106 and the shell 70 for generally receiving cooling air (see arrows 110) from the inner plenum 78 via a plurality of impingement holes 112 in the shell 70. Air flowing through the holes 110, impinge upon the cold face 106 of liner 74. The liner 74 has a plurality of effusion holes 114 that flow cooling air (see arrows 116) from the cooling cavity 108 and into the combustion chamber 66. The effusion holes 114 may be angled and/or orientated so that the cooling air 116, once in the combustion chamber 66, forms a thermally protective film or blanket of air across the liner 74.

Each impingement hole 112 has a centerline 118 that may be substantially normal to the cold face 106 of the liner 74. The impingement holes 112 and the effusion holes 114 may not overlap. That is, each impingement hole 112 forms a footprint 120 (i.e. a mimicking silhouette or shadow) upon the cold face 106 of the liner 74 that shares the centerline 118 and is generally spaced from the surrounding effusion holes 114. As best shown in FIG. 4, the impingement holes 112 (or footprints 120) may be symmetrically orientated forming a matrix (i.e. a matrix of six-by-six locations as an illustrated example) or series of rows 122 and columns 124 that may be substantially orthogonal or normal to one-another. Similarly, the effusion holes 114 may be symmetrically orientated forming a matrix or series of rows 126 and columns 128 that may be substantially orthogonal or normal to one-another.

For a selected region of the liner 74, the number of effusion holes 114 may substantially outnumber the number of impingement holes 112. That is, each impingement footprint 120 may generally replace what might have been a symmetrically orientated effusion hole 114. More specifically, every other row 126 and every other column 128 of the effusion holes 114 may fall along the respective rows 122 and columns 124 of the footprints 120, so that an additional effusion row 126 and effusion column 128 are located between adjacent impingement rows 122 and impingement columns 124.

For example and as illustrated in FIG. 4, a first impingement row 122A may co-extend with a first effusion row 126A wherein the combined row has alternating impingement footprint 120 and effusion hole 114 locations (three of each illustrated). A second effusion row 126B is generally on its own (six effusion holes illustrated) and centered between the first impingement row 122A and a second impingement row 122B. The second impingement row 122B may co-extend with a third effusion row 126C wherein the combined row has alternating impingement footprint 120 and effusion hole 114 locations (three of each illustrated). A fourth effusion row 126D is generally on its own and centered between the second impingement row 122B and a third impingement row 122C (six effusion holes illustrated). The third impingement row 122C may co-extend with a fifth effusion row 126E wherein the combined row has alternating impingement footprint 120 and effusion hole 114 locations (three of each illustrated). This symmetrical pattern may repeat itself for a given region of the liner 74.

Similar to the rows previously described, a first impingement column 124A may co-extend with a first effusion column 128A wherein the combined column has alternating impingement footprint 120 and effusion hole 114 locations (three of each illustrated). A second effusion column 128B is generally on its own (six effusion holes illustrated) and centered between the first impingement column 124A and a second impingement column 124B. The second impingement column 124B may co-extend with a third effusion column 128C wherein the combined column has alternating impingement footprint 120 and effusion hole 114 locations (three of each illustrated). A fourth effusion column 128D is generally on its own and centered between the second impingement column 124B and a third impingement column 124C (six effusion holes illustrated). The third impingement column 124C may co-extend with a fifth effusion column 128E wherein the combined column has alternating impingement footprint 120 and effusion hole 114 locations (three of each illustrated). This symmetrical pattern may repeat itself for a given region of the liner 74.

The liner 74 further has a plurality of cooling member arrays 130 that may be generally orientated at each footprint 120 and substantially centered about the centerline 118 in the cooling cavity 108. Each cooling member array 130 may have a radially inner plurality of members 132 (with respect to centerline 118) and an outer plurality of members 134. Each inner member 132 is located at least in-part within the footprint 120 (four illustrated in FIG. 4), and each outer member 134 is spaced outside of the footprint 120 (twelve illustrated in FIG. 4). The arrays 130 may generally be a repeating matrix of members. For example, the members 132, 134 may be distributed in a matrix of rows 136 and columns 138 that are generally normal to each other. In the present example, four rows 136 and four columns 138 are illustrated for each array 130.

Each array 130 functions to conduct heat out of the substrate 100 of the liner 74 and are cooled via the flow of cooling air 110 through the cooling cavity 108. The members 132, 134 may take the faun of any variety of shapes including pins and/or fins. Each member 132, 134 projects outward from the cold face 106 of the liner 74 and toward the shell 70. So as not to excessively obstruct the flow of cooling air 110 through the impingement holes 112, the inner members 132 may project outward from the cold face 106 by a projecting height (see arrow 140 in FIG. 3) that is within a range of about thirty to seventy percent of a distance (see arrow 142) measured between the shell 70 and the cold face 106 of the liner 74. To maximize cooling efficiency, the outer members 134 may project outward from the cold face 106 by a projecting height (see arrow 144) that is within a range of about seventy-five to one-hundred percent of the distance 142. It is further contemplated and understood that the term "pins" may include any variety of shapes including, but not limited to, cylindrical, pyramid and rectangular shapes.

It is further contemplated and understood that the arrays 130 need not be composed of rows and columns, but may be any known and repeating pattern where the cooling capacity of the array can be established and repeated. Similarly, the impingement holes 112, the effusion holes 114 and the arrays 130 need not be divided into rows and columns, but may be divided into any known and repeating pattern where the cooling capacity can be established and repeated.

During engine operation, thermal expansion of the shell 70 may vary from the thermal expansion of the liner 74. This displacement difference between the shell 70 and liners may be particularly noticeable along the edges of the floating panels that may comprise the liner. Although placement of the shell impingement holes 112 relative to the liner or panel arrays 130 is generally established during cold assembly of the combustor, some compensation for thermal expansion may be desired especially near the edges of any given liner panel.

The substrate 100 of the liner 74 may be made of a nickel-based super alloy, such as PWA 1455, or other suitable super alloys capable of withstanding elevated temperatures. Other materials and/or processes may include equiax, directionally-solidified single-crystal castings, metal powder or forged materials, composites, ceramics and hybrid combinations thereof. The arrays 130 may be made of the same material as the substrate 100 and cast as one unitary piece with the substrate. Alternatively, or in addition to the casting, the arrays 130 may be at least in-part machined into the casting or attached to the substrate 100 through brazing, additive manufacturing, or other means.

The coating 102 may include a bond coat secured directly to the hot side of the substrate 100, and a thermal barrier coat that covers the bond coat and is directly exposed to the combustion chamber 66 (not shown). The bond coat may be associated with a thermal, corrosion prevention, and/or environmental coating system; may be made of any variety of materials including nickel, cobalt, chromium, aluminum, and others; and, may be applied to the substrate via plating, plasma spray, electron beam, vapor deposition cathodic arc, sputtering, or other means. The thermal barrier coat may be one or more layers and may be made of ceramic based materials and/or any combination of yttria, zirconium and others.

Figure 5:
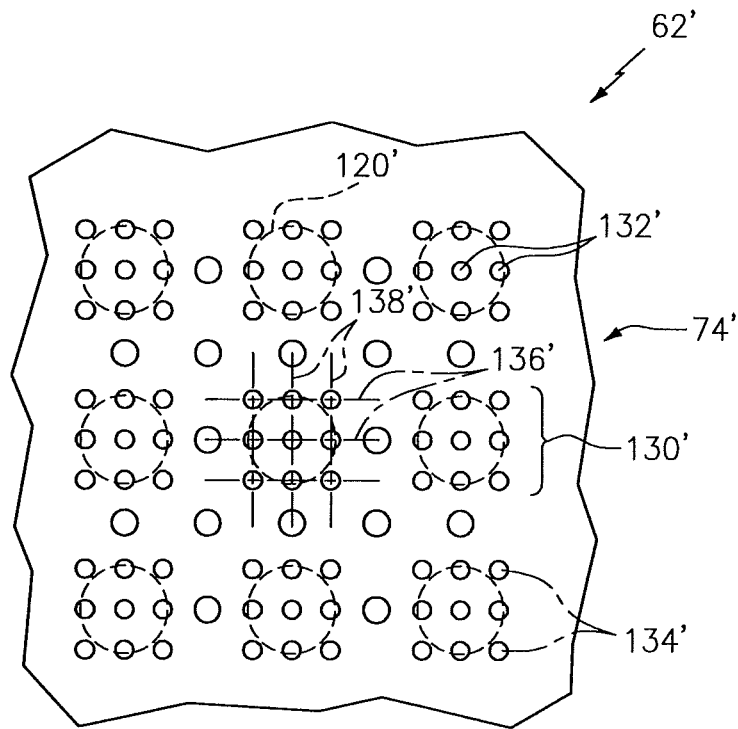
FIG. 5 is a plan view of a second embodiment of a liner similar in perspective to FIG. 4.

Referring to FIG. 5, a second embodiment of a wall assembly is illustrated wherein like elements to the first embodiment have like identifying numerals except with the addition of a prime symbol. A wall assembly 62' has a liner 74' that utilizes a cooling member array 130' having three rows 136' and three columns 138' of cooling members 132', 134'. Five inner members 132' are at least partially located within an impingement footprint 120' and four outer members 134' are located outside of the footprint 120'.

Figure 6:
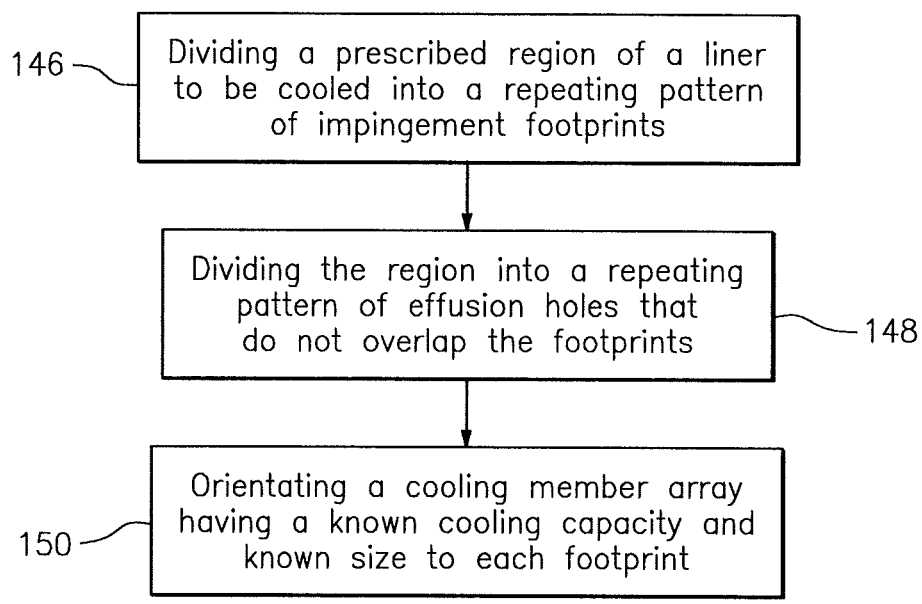
FIG. 6 is a flow chart illustrating a method of designing the wall assembly.

Referring to FIG. 6, a method of designing a combustor wall assembly 62 is illustrated. A first step 146 may include dividing a prescribed region of a cold side 106 of a liner 74 to be cooled into a repeating pattern of impingement footprints 120. One such example of a repeating pattern may be a plurality of impingement rows and columns 122, 124. A second step 148 may include further dividing the region into a repeating pattern of effusion holes 114 orientated such that the effusion holes 114 do not overlap the impingement footprints 120. One such example of a repeating pattern may be a plurality of effusion rows and columns 126, 128. A third step 150 may include orientating a cooling member array 130 having a known cooling capacity and known size (with respect to the footprint area) to each footprint 120. By designing with well-defined patterns, member arrays, impingement holes and effusion holes, cooling efficiency can be optimized with a reduced density of cooling features and holes allowing for a better degree of tolerance control.

While the invention is described with reference to exemplary embodiments, it will be understood by those skilled in the art that various changes may be made and equivalents may be substituted without departing from the spirit and scope of the invention. For example, the arrays 130, the effusion rows and columns 126, 128, and the impingement rows and columns 122, 124 may generally be located in any region of the combustor requiring cooling and that utilizes cooling holes through a shell and a liner. For instance, the liner 74 may be substituted for the liner or bulkhead panels 98, and the shell 70 may be substituted for the bulkhead support shell 96. In addition, different modifications may be made to adapt the teachings of the invention to particular situations or materials, without departing from the essential scope thereof. The invention is thus not limited to the particular examples disclosed herein, but includes all embodiments falling within the scope of the appended claims.

What is claimed is:

1. A combustor wall assembly comprising:
    a liner including a hot face defining a combustion chamber, a cold face opposite the hot face, and a plurality of effusion holes;
    a shell spaced outward from the cold face, the shell including a plurality of impingement holes, and a first impingement hole of the plurality of impingement holes having a centerline orientated normal to the cold face; and
    a plurality of cooling pin arrays, each of the plurality of cooling pin arrays including a first plurality of pins projecting outward from the cold face, and a first array of the plurality of cooling pin arrays spaced between adjacent effusion holes of the plurality of effusion holes and orientated about the centerline;
    wherein the first impingement hole of the plurality of impingement holes casts a footprint upon the cold surface about the centerline and spaced from the adjacent effusion holes;
    wherein each pin of the first plurality of pins in the first array of the plurality of cooling pin arrays is located completely within the footprint;
    wherein each of the plurality of cooling pin arrays include a second plurality of pins disposed outside of the footprint;
    wherein the first plurality of pins are shorter than the second plurality of pins; and
    wherein the second plurality of pins surrounds the first plurality of pins.

2. The combustor wall assembly set forth in claim 1, wherein the plurality of effusion holes and the plurality of impingement holes do not overlap.

3. The combustor wall assembly set forth in claim 1, wherein the shell is spaced from the cold face by a distance, each of the first plurality of pins have a height within a range of thirty to seventy percent of the distance, and each of the second plurality of pins have a height within a range of seventy-five to one-hundred percent of the distance.

4. The combustor wall assembly set forth in claim 1, wherein the plurality of effusion holes and the plurality of impingement holes are each arranged in an orthogonal pattern.

5. The combustor wall assembly set forth in claim 4, wherein the plurality of effusion holes are arranged in a plurality of effusion rows and a plurality of effusion columns, and the plurality of impingement holes are arranged in a plurality of impingement rows and a plurality of impingement columns.

6. The combustor wall assembly set forth in claim 5, wherein each of the plurality of impingement rows co-extend with every other of the plurality of effusion rows.

7. The combustor wall assembly set forth in claim 6, wherein each of the plurality of impingement columns co-extend with every other of the plurality of effusion columns.

8. The combustor wall assembly set forth in claim 1, wherein each of the plurality of cooling pin arrays are arranged in an orthogonal pattern.

9. The combustor wall assembly set forth in claim 8, wherein each of the plurality of cooling pin arrays are arranged in a plurality of pin rows and a plurality of pin columns.

10. The combustor wall assembly set forth in claim 9, wherein the plurality of pin columns is four columns and the plurality of pin rows is four rows.

11. The combustor wall assembly of claim 1, wherein a shape of the footprint mimics a shape of a cross-section of the first impingement hole of the plurality of impingement holes, and an area of the footprint mimics an area of the cross-section.

12. The combustor wall assembly of claim 1, wherein
    each pin of the first plurality of pins in the first array of the plurality of cooling pin arrays is located completely within the footprint such that the first plurality of pins are symmetrically oriented about the centerline and overlap the footprint; and
    the first plurality of pins are arranged in a plurality of rows and a plurality of columns to create an orthogonal pattern within the footprint.

13. A combustor wall assembly of a gas turbine engine comprising:
    a liner including a face and a plurality of effusion holes communicating through the liner;
    a shell spaced from the face, the shell comprising a plurality of impingement holes, a first impingement hole of the plurality of impingement holes casting a footprint onto the face, wherein the footprint mimics a shape of the first impingement hole of the plurality of impingement holes; and
    a plurality of cooling member arrays spaced between the plurality of effusion holes and projecting outward from the face, a first array of the plurality of cooling member arrays having
        a first plurality of cooling members located completely within the footprint; and
        a second plurality of cooling members located outside of and distributed about the footprint;
    wherein the first plurality of cooling members project outward from the face by a distance less than a projecting distance of the second plurality of cooling members; and
    wherein the second plurality of pins surrounds the first plurality of pins.

14. The combustor wall assembly set forth in claim 13, wherein at least one of the first plurality of cooling members or the second plurality of cooling members are pins.

15. The combustor wall assembly set forth in claim 13, wherein the plurality of impingement holes are offset from the plurality of effusion holes, and wherein a cooling cavity is defined between the shell and the face with the plurality of cooling member arrays located in the cooling cavity.

16. A combustor assembly, comprising:
    a liner configured with a hot face adjacent a combustion chamber, a cold face opposite the hot face, and a plurality of effusion holes;
    a shell spaced from the cold face, the shell configured with a plurality of impingement holes, and each of the plurality of impingement holes having a centerline orientated normal to the cold face; and a plurality of cooling pin arrays comprising a first cooling pin array configured with a first plurality of pins projecting outward from the cold face, the first cooling pin array spaced between adjacent effusion holes of the plurality of effusion holes, and the first plurality of pins are arranged about the centerline of and completely overlapped by a footprint of a first impingement hole of the plurality of impingement holes;

wherein each of the plurality of cooling pin arrays include a second plurality of pins disposed outside of the footprint;

wherein the first plurality of pins are shorter than the second plurality of pins; and wherein the second plurality of pins surrounds the first plurality of pins.

\* \* \* \* \*